(12) United States Patent
Kurabuchi et al.

(10) Patent No.: US 11,552,325 B2
(45) Date of Patent: Jan. 10, 2023

(54) FLOW BATTERY

(71) Applicant: Panasonic Intellectual Property Management Co., Ltd., Osaka (JP)

(72) Inventors: Takahiro Kurabuchi, Osaka (JP); Honami Sako, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 17/088,592

(22) Filed: Nov. 4, 2020

(65) Prior Publication Data

US 2021/0151785 A1 May 20, 2021

(30) Foreign Application Priority Data

Nov. 15, 2019 (JP) .............................. JP2019-207134
Apr. 16, 2020 (JP) .............................. JP2020-073427

(51) Int. Cl.
*H01M 8/18* (2006.01)
*H01M 8/04186* (2016.01)
*H01M 8/04082* (2016.01)

(52) U.S. Cl.
CPC ....... *H01M 8/188* (2013.01); *H01M 8/04186* (2013.01); *H01M 8/04201* (2013.01)

(58) Field of Classification Search
CPC ............. H01M 8/188; H01M 8/04186; H01M 8/04201; H01M 8/0236; H01M 8/04197
See application file for complete search history.

(56) References Cited

U.S. PATENT DOCUMENTS

| | | | |
|---|---|---|---|
| 2016/0181626 A1* | 6/2016 | Madabusi | H01M 8/0221 429/105 |
| 2017/0162881 A1* | 6/2017 | Dong | H01M 8/0245 |
| 2018/0026293 A1 | 1/2018 | Fujimoto et al. | |
| 2018/0072669 A1* | 3/2018 | Liu | H01M 8/188 |

FOREIGN PATENT DOCUMENTS

JP 2018-018816 2/2018

\* cited by examiner

*Primary Examiner* — Stewart A Fraser
(74) *Attorney, Agent, or Firm* — McDermott Will & Emery LLP

(57) ABSTRACT

A flow battery includes a negative electrode, a positive electrode, a first liquid in contact with the negative electrode, a second liquid in contact with the positive electrode, and a lithium-ion-conductive film disposed between the first liquid and the second liquid. At least one of the first liquid or the second liquid contains a redox species and lithium ions. The lithium-ion-conductive film includes an inorganic member containing zeolite.

12 Claims, 10 Drawing Sheets

FLOW BATTERY

BACKGROUND

1. Technical Field

The present disclosure relates to a flow battery.

2. Description of the Related Art

Japanese Unexamined Patent Application Publication No. 2018-18816 discloses a flow battery including a liquid having a property of releasing solvated electrons of lithium so as to dissolve lithium as cations and a separating portion having lithium-ion conductivity.

SUMMARY

One non-limiting and exemplary embodiment provides a flow battery in which redox species crossover is suppressed.

In one general aspect, the techniques disclosed herein feature a flow battery including a negative electrode, a positive electrode, a first liquid in contact with the negative electrode, a second liquid in contact with the positive electrode, and a lithium-ion-conductive film disposed between the first liquid and the second liquid, wherein at least one of the first liquid or the second liquid contains a redox species and lithium ions, and the lithium-ion-conductive film includes an inorganic member containing zeolite.

According to the present disclosure, a flow battery, in which redox species crossover is suppressed, can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
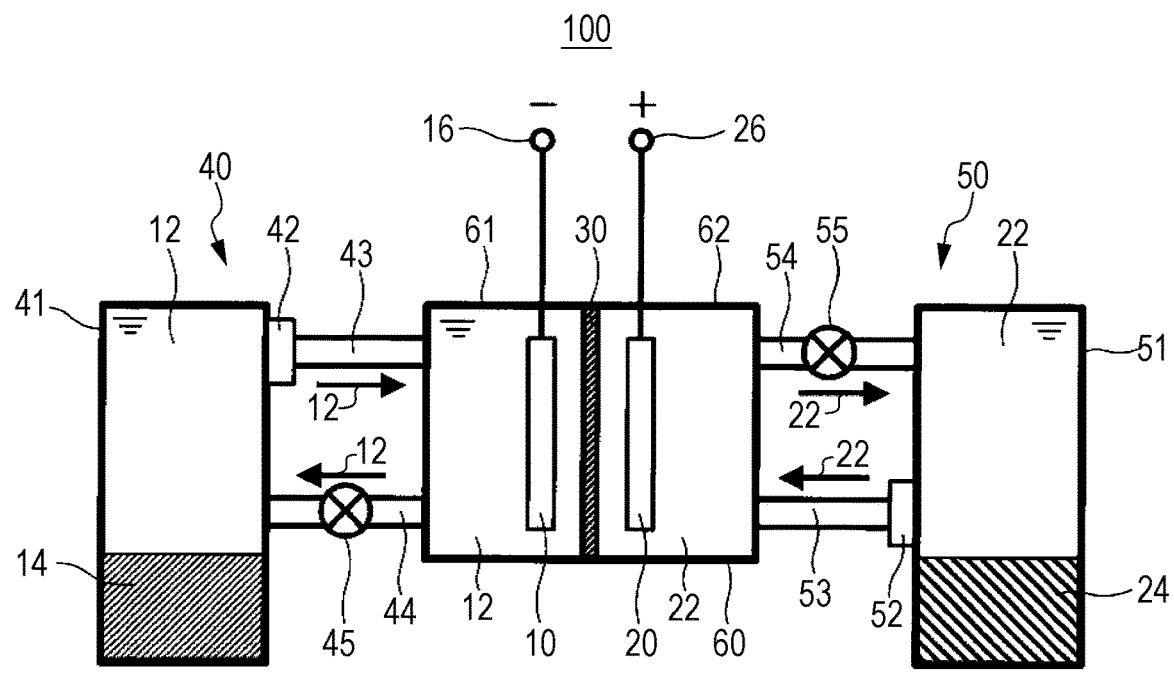
FIG. 1 is a schematic diagram illustrating the configuration of a flow battery according to the present embodiment.

Outline of an Aspect According to the Present Disclosure

A flow battery according to a first aspect includes
a negative electrode,
a positive electrode,
a first liquid in contact with the negative electrode,
a second liquid in contact with the positive electrode, and
a lithium-ion-conductive film disposed between the first liquid and the second liquid, wherein
at least one of the first liquid or the second liquid contains a redox species and lithium ions, and
the lithium-ion-conductive film includes an inorganic member containing zeolite.

According to the first aspect, in the lithium-ion-conductive film, the inorganic member has pores derived from zeolite. In general, the pores have an average diameter larger than the lithium ion size and smaller than the molecular size of a first redox species. Consequently, the inorganic member allows lithium ions to pass through it but hardly allow the redox species to pass through it. The lithium-ion-conductive film containing the inorganic member enables suppressing crossover, the crossover being movement of the redox species from the first liquid to the second liquid or movement of the redox species from the second liquid to the first liquid.

According to a second aspect of the present disclosure, for example, in the flow battery according to the first aspect, the lithium-ion-conductive film may further include a porous supporter that supports the inorganic member. According to the second aspect, the lithium-ion-conductive film has high mechanical strength.

According to a third aspect of the present disclosure, for example, in the flow battery according to the second aspect, at least one selected from the group consisting of requirements (i) and (ii) given below may be satisfied,
(i) the inorganic member is an inorganic layer located outside the porous supporter, and
(ii) the inorganic member is an inorganic filler located inside holes of the porous supporter.

According to a fourth aspect of the present disclosure, for example, in the flow battery according to the third aspect, the lithium-ion-conductive film may have a multilayer structure including the inorganic layer and the porous supporter.

According to the third or fourth aspect, in the flow battery, redox species crossover can be further reliably suppressed.

According to a fifth aspect of the present disclosure, for example, in the flow battery according to the third or fourth aspect, the inorganic layer may have a thickness which is greater than or equal to 0.1 µm and is less than or equal to 100 µm. According to the fifth aspect, since the thickness of the inorganic layer is greater than or equal to 0.1 µm, cracks, pinholes, and the like do not occur easily in the inorganic layer. Consequently, the lithium-ion-conductive film can further reliably suppress redox species crossover. The thickness of the inorganic layer being less than or equal to 100 μm enables the lithium-ion-conductive film to have sufficiently high lithium ion conductivity.

According to a sixth aspect of the present disclosure, for example, in the flow battery according to any one of the second aspect to the fifth aspect, the porous supporter may contain an inorganic material.

According to a seventh aspect of the present disclosure, for example, in the flow battery according to any one of the second aspect to the sixth aspect, the porous supporter may contain at least one selected from the group consisting of alumina, silica, zirconia, and glass.

According to the sixth or seventh aspect, the porous supporter has high chemical durability with respect to the first liquid and the second liquid.

According to an eighth aspect of the present disclosure, for example, in the flow battery according to any one of the second aspect to the seventh aspect, the porous supporter may have an average hole diameter which is greater than or equal to 10 nm and is less than or equal to 100 μm. According to the eighth aspect, the porous supporter having an average hole diameter which is greater than or equal to 10 nm enables the first liquid or the second liquid to readily enter holes of the porous supporter. When the average hole diameter of the porous supporter is less than or equal to 100 μm, the surface roughness of the porous supporter is relatively small. In the case where the inorganic member is an inorganic layer, the lower the surface roughness of the porous supporter is, the easier the stacking of the inorganic layer on the porous supporter is.

According to a ninth aspect of the present disclosure, for example, in the flow battery according to any one of the first aspect to the eighth aspect, the ratio of the amount of substance of silicon atoms to the amount of substance of aluminum atoms in the zeolite may be greater than or equal to 1 and less than or equal to 25.

According to a tenth aspect of the present disclosure, for example, in the flow battery according to the ninth aspect, the ratio may be greater than or equal to 1 and is less than or equal to 10.

According to the ninth or tenth aspect, the aluminum atom content in the zeolite is relatively high. In the zeolite, sites that can stabilize alkali metal ions are present in the vicinity of aluminum atoms. Lithium ions tend to move along the sites in the zeolite. Therefore, the higher the aluminum atom content in the zeolite is, the easier the movement of lithium ions inside the inorganic member is. Since lithium ions move easily inside the inorganic member, the lithium-ion-conductive film has high lithium ion conductivity.

According to an eleventh aspect of the present disclosure, for example, in the flow battery according to any one of the first aspect to the tenth aspect, the zeolite may contain lithium ions.

According to the eleventh aspect, sites at which lithium ions are located are present in the zeolite. The presence of the sites enables reducing the resistance when lithium ions move from the first liquid to the second liquid or the resistance when lithium ions move from the second liquid to the first liquid. In other words, the presence of the sites at which lithium ions are located enables lithium ions to readily move from the first liquid to the second liquid or to readily move from the second liquid to the first liquid through the lithium-ion-conductive film.

According to a twelfth aspect of the present disclosure, for example, the flow battery according to any one of the first aspect to the eleventh aspect may further include a negative electrode active material in contact with the first liquid, wherein the redox species may be a first redox species contained in the first liquid, and the first redox species may be oxidized or reduced by the negative electrode and may be oxidized or reduced by the negative electrode active material.

According to a thirteenth aspect of the present disclosure, for example, the flow battery according to the twelfth aspect may further include a first circulatory mechanism configured to circulate the first liquid between the negative electrode and the negative electrode active material.

According to a fourteenth aspect of the present disclosure, for example, the flow battery according to any one of the first aspect to the eleventh aspect may further include a positive electrode active material in contact with the second liquid, wherein the redox species may be a second redox species contained in the second liquid, and the second redox species may be oxidized or reduced by the positive electrode and may be oxidized or reduced by the positive electrode active material.

According to a fifteenth aspect of the present disclosure, for example, the flow battery according to the fourteenth aspect may further include a second circulatory mechanism configured to circulate the second liquid between the positive electrode and the positive electrode active material.

According to the twelfth aspect to the fifteenth aspect, the flow battery has a high volume energy density.

The embodiment according to the present disclosure will be described below with reference to the drawings. The present disclosure is not limited to the following embodiment.

FIG. 1 is a schematic diagram illustrating the configuration of a flow battery 100 according to the present embodiment. As illustrated in FIG. 1, the flow battery 100 includes a negative electrode 10, a positive electrode 20, a first liquid 12, a second liquid 22, and a lithium-ion-conductive film 30. The flow battery 100 may further include a negative electrode active material 14. The first liquid 12 contains, for example, a first nonaqueous solvent. The first liquid 12 is in contact with, for example, each of the negative electrode 10 and the negative electrode active material 14. In other words, each of the negative electrode 10 and the negative electrode active material 14 is immersed in the first liquid 12. At least part of the negative electrode 10 is in contact with the first liquid 12. The second liquid 22 contains, for example, a second nonaqueous solvent. The second liquid 22 is in contact with the second electrode 20. In other words, the second electrode 20 is immersed in the second liquid 22. At least part of the second electrode 20 is in contact with the second liquid 22. At least one of the first liquid 12 or the second liquid 22 contains a redox species and lithium ions. The first liquid 12 contains, for example, a first redox species as the redox species. The second liquid 22 contains, for example, a second redox species as the redox species. The lithium-ion-conductive film 30 is disposed between the first liquid 12 and the second liquid 22 and separates the first liquid 12 and the second liquid 22 from each other.

The lithium-ion-conductive film 30 includes an inorganic member containing zeolite. The lithium-ion-conductive film 30 is not limited to including an inorganic member containing a single kind of zeolite. The lithium-ion-conductive film 30 may include an inorganic member containing a plurality of kinds of zeolites. The lithium-ion-conductive film 30 may further include a porous supporter that supports the inorganic member. In the flow battery 100, for example, at least one selected from the group consisting of requirements (i) and (ii) given below is satisfied,
(i) the inorganic member is an inorganic layer located outside the porous supporter, and
(ii) the inorganic member is an inorganic filler located inside holes of the porous supporter.

Requirement (i)

Figure 2A:
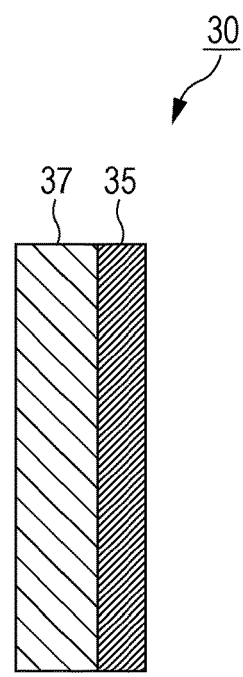
FIG. 2A is a sectional view illustrating an example of a lithium-ion-conductive film included in the flow battery according to the present embodiment.

Requirement (i) will be described. FIG. 2A is a sectional view illustrating an example of the lithium-ion-conductive film 30 included in the flow battery 100 according to the present embodiment. As illustrated in FIG. 2A, the lithium-ion-conductive film 30 includes an inorganic layer 35 and a porous supporter 37. The inorganic layer 35 is located outside the porous supporter 37 and is supported by the porous supporter 37. The inorganic layer 35 may be in contact with the porous supporter 37. That is, the lithium-ion-conductive film 30 may have a multilayer structure including the inorganic layer 35 and the porous supporter 37 and may be formed from the multilayer structure only. In the flow battery 100, for example, the porous supporter 37 is in contact with the first liquid 12, and the inorganic layer 35 is in contact with the second liquid 22. However, the porous supporter 37 may be in contact with the second liquid 22, and the inorganic layer 35 may be in contact with the first liquid 12.

Figure 2B:
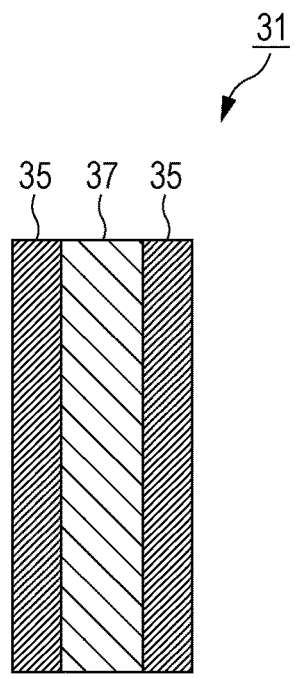
FIG. 2B is a sectional view illustrating another example of the lithium-ion-conductive film.

The lithium-ion-conductive film 30 may include a plurality of inorganic layers 35. FIG. 2B is a sectional view illustrating another example of the lithium-ion-conductive film 30. A lithium-ion-conductive film 31 in FIG. 2B includes two inorganic layers 35 and a porous supporter 37. In the lithium-ion-conductive film 31, the porous supporter 37 is located between the two inorganic layers 35. The lithium-ion-conductive film 31 having such a configuration is uniformly shrinkable or expandable by heat. In the case where the lithium-ion-conductive film 31 is used, the first liquid 12 or the second liquid 22 may be introduced into the holes of the porous supporter 37 in advance. Consequently, the lithium-ion-conductive film 31 has sufficient lithium ion conductivity.

Figure 2C:
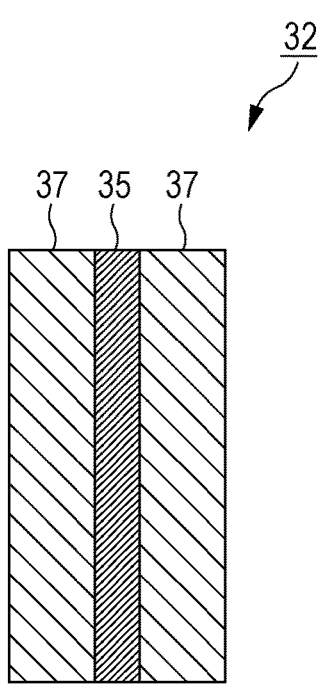
FIG. 2C is a sectional view illustrating another example of the lithium-ion-conductive film.

The lithium-ion-conductive film 30 may include a plurality of porous supporters 37. FIG. 2C is a sectional view illustrating another example of the lithium-ion-conductive film 30. A lithium-ion-conductive film 32 in FIG. 2C includes two porous supporters 37 and an inorganic layer 35. In the lithium-ion-conductive film 32, the inorganic layer 35 is located between the two porous supporters 37. The lithium-ion-conductive film 32 having such a configuration has high mechanical strength.

The inorganic layer 35 covers, for example, the entire principal surface of the porous supporter 37. In the present specification, the principal surface denotes a surface having the largest surface area among surfaces of the porous supporter 37. The inorganic layer 35 may partly cover the principal surface of the porous supporter 37 provided that redox species crossover can be suppressed.

The inorganic layer 35 may contain zeolite as a primary component or may be substantially composed of zeolite. "Primary component" denotes a component, the content of which is largest in the inorganic layer 35 on a weight ratio basis. "Substantially composed of a component" denotes exclusion of other components that change the essential characteristics of the material concerned. The inorganic layer 35 may contain impurities in addition to the zeolite.

The zeolite is an aluminosilicate having crystallinity and including aluminum atoms and silicon atoms. The ratio of the amount of substance of silicon atoms to the amount of substance of aluminum atoms (hereafter also referred to as molar ratio Si/Al) in the zeolite may be greater than or equal to 1 and less than or equal to 25 or may be greater than or equal to 1 and less than or equal to 10. As described in examples 1 to 3 later, regarding an evaluation cell in which zeolite had a molar ratio Si/Al of greater than or equal to 1 and less than or equal to 10, the open circuit voltage of the cell was maintained, and a discharge current of 0.1 µA was observed. Meanwhile, regarding an evaluation cell in which zeolite had a molar ratio Si/Al of greater than or equal to 10 and less than or equal to 25, the open circuit voltage of the cell was maintained, but a discharge current greater than or equal to 0.1 µA was not observed. In this regard, the result of example 3 does not deny a possibility of the discharge current of less than 0.1 µA being observed. From these results, the molar ratio Si/Al of the zeolite may be less than or equal to 25 or may be less than or equal to 10. The reason for this may be as described below. The lower the molar ratio S/Al is, the higher the aluminum atom content in the zeolite is. In the zeolite, sites that can stabilize alkali metal ions are present in the vicinity of aluminum atoms. Lithium ions tend to move along the sites in the zeolite. Therefore, the higher the aluminum atom content in the zeolite is, the easier the movement of lithium ions inside the inorganic layer 35 is. Meanwhile, since the molar ratio Si/Al of zeolite is greater than or equal to 1 in general, the molar ratio Si/Al may be greater than or equal to 1.

The zeolite may further contain lithium in addition to aluminum atoms and silicon atoms. Lithium exists in, for example, the skeleton of the zeolite. In the zeolite, lithium exists in the form of, for example, ions. As described above, in the zeolite, sites that can stabilize alkali metal ions are present in the vicinity of aluminum atoms. Lithium ions are located at, for example, sites that can stabilize alkali metal ions. Therefore, the higher the aluminum atom content in the zeolite is, the higher the concentration of lithium ions existing in the zeolite is. The presence of the sites at which lithium ions are located enables reducing the resistance when lithium ions move from the first liquid 12 to the second liquid 22 or the resistance when lithium ions move from the second liquid 22 to the first liquid 12. In other words, the presence of the sites at which lithium ions are located enables lithium ions to readily move from the first liquid 12 to the second liquid 22 or to readily move from the second liquid 22 to the first liquid 12 through the lithium-ion-conductive film 30.

Some of the aluminum atoms contained in the zeolite are in contact with pores of the zeolite. These aluminum atoms constitute the inner walls of pores of the zeolite. In the case where lithium ions are located in the vicinity of aluminum atoms constituting the inner walls of pores of the zeolite, lithium ions that exist in the first liquid 12 or the second liquid 22 can further readily move inside the pores of the zeolite. Consequently, lithium ions can further readily move inside the inorganic layer 35.

There is no particular limitation regarding the crystal structure of the zeolite, and examples include an LTA type, an MOR type, and a CHA type. The crystal structure of the zeolite is determined in accordance with the composition and the like of the zeolite.

The inorganic layer 35 has pores derived from the zeolite. The pores of the inorganic layer 35 have an average diameter which is greater than or equal to 0.2 nm and is less than or equal to 1.0 nm. The inorganic layer 35 does not have, for example, holes other than pores derived from the zeolite and is dense. The average pore diameter of the zeolite may be specified by using, for example, the following method. The crystal structure of the zeolite contained in the inorganic layer 35 is specified. The crystal structure of the zeolite may be specified by, for example, performing X-ray diffraction (XRD) measurement on the inorganic layer 35 and analyzing the measurement result. The crystal structure of the zeolite may be specified on the basis of the composition of the zeolite. The composition of the zeolite may be specified by, for example, performing element analysis such as energy dispersive X-ray analysis (EDX) of the inorganic layer 35 and analyzing the analytical result. The average pore diameter of the zeolite is determined on the basis of the specified crystal structure of the zeolite. The average pore diameter of the zeolite can be assumed to be the average pore diameter of the inorganic layer 35.

The average pore diameter of the inorganic layer 35 is usually larger than the size of a lithium ion and smaller than the molecular size of the first redox species. Therefore, using the lithium-ion-conductive film 30 enables ensuring the lithium-ion-transmission property and enables sufficiently suppressing crossover of first redox species moving to the second liquid 22. In the present specification, the size of a lithium ion denotes, for example, the diameter of a lithium ion. As an example, the diameter of a lithium ion is greater than or equal to 0.12 nm and is less than or equal to 0.18 nm. The molecular size of the first redox species denotes the diameter of a minimum size sphere that can circumscribe the first redox species. The molecular size of the first redox species may be calculated by, for example, a first-principles calculation using the density functional method B3LYP/6-31G. The molecular size of the first redox species is, for example, more than 1 nm.

The inorganic layer 35 has a thickness, for example, which is greater than or equal to 0.1 μm and is less than or equal to 100 μm. When the thickness of the inorganic layer 35 is greater than or equal to 0.1 μm, cracks, pinholes, and the like do not easily occur in the inorganic layer 35. Therefore, the lithium-ion-conductive film 30 including the inorganic layer 35 having a thickness greater than or equal to 0.1 μm can further reliably suppress first redox species crossover. The lithium-ion-conductive film 30 can further reliably suppress the first liquid 12 and the second liquid 22 mixing with each other. The thickness of the inorganic layer 35 being less than or equal to 100 μm enables the lithium-ion-conductive film 30 to have sufficiently high lithium ion conductivity. The thickness of the inorganic layer 35 may be greater than or equal to 1 μm and less than or equal to 50 μm. The thickness of the inorganic layer 35 may be specified by, for example, the following method. A cross section of the lithium-ion-conductive film 30 is observed by using a scanning electron microscope. Using the resulting electron microscope image, the distance between opposite principal surfaces of the inorganic layer 35 is measured at a plurality of randomly selected pairs of points (for example, 5 pairs of points). The average value of the resulting values can be assumed to be the thickness of the inorganic layer 35.

The porous supporter 37 has, for example, a tabular shape or a cylindrical shape. The porous supporter 37 has a plurality of holes. In the porous supporter 37, at least one hole of the plurality of holes may be connected to other holes. The plurality of holes may be formed in a three-dimensionally interconnected manner. However, the plurality of holes may be independent of each other. At least one hole of the plurality of holes may be a through hole that extends through the porous supporter 37 in the thickness direction.

The porous supporter 37 contains, for example, an inorganic material. The porous supporter 37 may contain an inorganic material as a primary component or may be substantially composed of an inorganic material. The porous supporter 37 may contain impurities in addition to the inorganic material. The porous supporter 37 contains, for example, at least one selected from the group consisting of alumina, silica, zirconia, and glass as the inorganic material. The porous supporter 37 containing the inorganic material has high chemical durability with respect to the first liquid 12 and the second liquid 22.

The porous supporter 37 has an average hole diameter which is, for example, greater than or equal to 10 nm and less than or equal to 100 μm. Since the average hole diameter of the porous supporter 37 is greater than or equal to 10 nm, the first liquid 12 or the second liquid 22 can easily enter the holes of the porous supporter 37. When the average hole diameter of the porous supporter 37 is less than or equal to 100 μm, the surface roughness of the porous supporter 37 is relatively small. The lower the surface roughness of the porous supporter 37 is, the easier the stacking of the inorganic layer 35 on the porous supporter 37 is.

The average hole diameter d of the porous supporter 37 can be calculated by, for example, substituting the specific surface area a and the total pore volume v of the porous supporter 37 into the following equation. The average hole diameter d corresponds to the diameter of a cylindrical pore, where each of the holes included in the porous supporter 37 is assumed to be a single cylindrical pore.

$$\text{average hole diameter } d = 4 \times (\text{total pore volume } v)/(\text{specific surface area } a)$$

The total pore volume of the porous supporter 37 can be obtained by, for example, obtaining adsorption isotherm data by a gas adsorption method using nitrogen gas and converting the data by the Barrett-Joyner-Halenda (BJH) method. The specific surface area of the porous supporter 37 can be obtained by, for example, obtaining adsorption isotherm data by a gas adsorption method using nitrogen gas and converting the data by the Brunauer-Emmett-Teller (BET) method. The average hole diameter of the porous supporter 37 may be measured by using a method such as a mercury penetration method, direct observation by using an electron microscope, or a positron annihilation method.

There is no particular limitation regarding the method for manufacturing the lithium-ion-conductive film 30 of requirement (i). The lithium-ion-conductive film 30 may be produced by, for example, the following method. Initially, a dispersion liquid containing seed crystals of zeolite is prepared. The porous supporter 37 is immersed into the resulting dispersion liquid. As a result, seed crystals of zeolite are attached to the surface of the porous supporter 37. Subsequently, the porous supporter 37, in which seed crystals of zeolite are attached to the surface, is immersed into a solution containing a material for forming zeolite, and a crystal growth method such as a hydrothermal synthesis method is performed. Consequently, zeolite crystals grow where seed crystals attached to the porous supporter 37 serve as nuclei. The inorganic layer 35 is formed with zeolite crystal growth, and thus the lithium-ion-conductive film 30 can be obtained.

In the case where zeolite contained in the inorganic layer 35 of the lithium-ion-conductive film 30 contains alkali metal ions other than lithium ions or alkaline earth metal ions, ion exchange treatment may be performed by the following method. Initially, an aqueous solution containing lithium ions is prepared. There is no particular limitation regarding the lithium ion concentration in the aqueous solution. The lithium ion concentration is, for example, greater than or equal to 0.01 mol/L. The aqueous solution may be a saturated aqueous solution of lithium ions. Subsequently, the lithium-ion-conductive film 30 is immersed into the aqueous solution. At this time, the aqueous solution may be heated as the situation demands. For example, the temperature of the aqueous solution is higher than or equal to room temperature and is lower than or equal to the boiling temperature of the aqueous solution. In the present specification, "room temperature" is, for example, 25° C. In the aqueous solution, alkali metal ions or alkaline earth metal ions contained in the zeolite are exchanged for lithium ions. Consequently, the zeolite containing lithium ions is formed. In the case where ion exchange treatment is performed by using such a method, lithium ions tend to be located in the vicinity of aluminum atoms constituting the inner walls of pores of the zeolite.

Requirement (ii)

Next, requirement (ii) will be described. Regarding requirement (ii), the inorganic member is an inorganic filler located inside the pores of the porous supporter. The inorganic filler is supported by the porous supporter inside the holes of the porous supporter. In particular, the inorganic filler is introduced into each of the plurality of holes of the porous supporter. The inorganic filler may be partly introduced into each of the plurality of holes of the porous supporter or may be entirely introduced into each of the plurality of holes. For example, the inorganic filler separates the first liquid 12 and the second liquid 22 from each other while being in contact with both the first liquid 12 and the second liquid 22 that enter the holes of the porous supporter. There is no particular limitation regarding the shape of the inorganic filler, and particles may be particulate.

The composition of the inorganic filler is, for example, the same as the composition of the inorganic layer 35 described in requirement (i). The inorganic filler has pores derived from zeolite. The inorganic filler has the same average pore diameter as that of the inorganic layer 35 described in requirement (i). The porous supporter of requirement (ii) is the same as, for example, the porous supporter 37 of requirement (i).

The lithium-ion-conductive film 30 of requirement (ii) may be produced by the following method. Initially, a dispersion liquid containing seed crystals of zeolite is prepared. The resulting dispersion liquid is brought into contact with the inner walls of holes of the porous supporter. There is no particular limitation regarding the method for bringing the dispersion liquid into contact with the inner walls of the holes of the porous supporter. For example, the dispersion liquid may be brought into contact with the inner walls of holes of the porous supporter by immersing the porous supporter into the dispersion liquid. Further, the dispersion liquid may also be brought into contact with the inner walls of holes of the porous supporter by reducing the pressure of the space in which the dispersion liquid is placed while the porous supporter is immersed in the dispersion liquid. At this time, the space in which the dispersion liquid is placed may be decompressed to a vacuum atmosphere. Seed crystals of zeolite are attached to the inner walls of holes of the porous supporter by the dispersion liquid coming into contact with the inner walls of holes of the porous supporter. Subsequently, the porous supporter in which seed crystals of zeolite are attached to the inner walls is immersed into a solution containing a material for forming zeolite, and a crystal growth method such as a hydrothermal synthesis method is performed. Consequently, zeolite crystals grow where seed crystals attached to the porous supporter serve as nuclei. The inorganic filler is formed due to zeolite crystal growth, and the lithium-ion-conductive film 30 can be obtained.

In the case where zeolite contained in the inorganic filler of the lithium-ion-conductive film 30 contains alkali metal ions other than lithium ions or alkaline earth metal ions, ion exchange treatment may be performed by the following method. Initially, an aqueous solution containing lithium ions is prepared. There is no particular limitation regarding the lithium ion concentration in the aqueous solution. The lithium ion concentration is, for example, greater than or equal to 0.01 mol/L. The aqueous solution may be a saturated aqueous solution of lithium ions. Subsequently, the lithium-ion-conductive film 30 is immersed into the aqueous solution. At this time, the aqueous solution may be heated as the situation demands. For example, the temperature of the aqueous solution is higher than or equal to room temperature and is lower than or equal to the boiling temperature of the aqueous solution. In the aqueous solution, alkali metal ions or alkaline earth metal ions contained in the zeolite are exchanged for lithium ions. Consequently, the zeolite containing lithium ions is formed. In the case where ion exchange treatment is performed by using such a method, lithium ions tend to be located in the vicinity of aluminum atoms constituting the inner walls of pores of the zeolite.

In the flow battery 100, both requirement (i) and requirement (ii) may be satisfied. That is, in the flow battery 100, the lithium-ion-conductive film 30 may include the inorganic layer 35 and the porous supporter 37 and may further include the inorganic filler located inside the holes of the porous supporter 37. At this time, the inorganic layer 35 may be in contact with the inorganic filler. In the case where the inorganic layer 35 is not in contact with the inorganic filler, the first liquid 12 or the second liquid 22 may be introduced inside the hole of the porous supporter 37 between the inorganic layer 35 and the inorganic filler.

In the flow battery 100, the first liquid 12 functions as an electrolytic solution. A first nonaqueous solvent contained in the first liquid 12 contains, for example, a compound having at least one selected from the group consisting of a carbonate group and an ether bond. The first nonaqueous solvent may contain at least one selected from the group consisting of propylene carbonate (PC), ethylene carbonate (EC), dimethyl carbonate (DMC), ethyl methyl carbonate (EMC), and diethyl carbonate (DEC) as a compound having a carbonate group. The first nonaqueous solvent may contain at least one selected from the group consisting of dimethoxyethane, diethoxyethane, dibutoxyethane, diglyme (diethylene glycol dimethyl ether), triglyme (triethylene glycol dimethyl ether), tetraglyme (tetraethylene glycol dimethyl ether), polyethylene glycol dialkyl ether, tetrahydrofuran, 2-methyl tetrahydrofuran, 2,5-dimethyl tetrahydrofuran, 1,3-dioxolane, and 4-methyl-1,3-dioxolane as a compound having an ether bond.

The first redox species contained in the first liquid 12 can be dissolved in the first liquid 12. The first redox species is electrochemically oxidized or reduced by the negative electrode 10 and electrochemically oxidized or reduced by the negative electrode active material 14. In other words, the first redox species functions as a negative electrode mediator. In the case where the flow battery 100 does not include the negative electrode active material 14, the first redox species functions as an active material that is oxidized or reduced by the negative electrode 10 only.

The first redox species contains, for example, an organic compound that dissolves lithium as cations. The organic compound may be an aromatic compound or a condensed aromatic compound. The first redox species contains, for example, at least one selected from the group consisting of biphenyl, phenanthrene, trans-stilbene, cis-stilbene, triphenylene, o-terphenyl, m-terphenyl, p-terphenyl, anthracene, benzophenone, acetophenone, butyrophenone, valerophenone, acenaphthene, acenaphthylene, fluoranthene, benzyl, and 2,2'-bipyridyl as an aromatic compound. There is no particular limitation regarding the molecular weight of the first redox species. The molecular weight may be greater than or equal to 100 and less than or equal to 500 or may be greater than or equal to 100 and less than or equal to 300.

When an aromatic compound is used as the first redox species and lithium is dissolved in the first liquid 12, the first liquid 12 may exhibit a very low potential of less than or equal to 0.5 V vs. $Li^+/Li$. According to this first liquid 12, a combination with the second liquid 22 that exhibits a potential of greater than or equal to 2.5 V vs. $Li^+/Li$ enables obtaining a flow battery 100 that exhibits a high battery voltage of greater than or equal to 3.0 V. Consequently, the flow battery 100 having a high energy density can be realized.

The first liquid 12 may further contain an electrolyte. The electrolyte is, for example, at least one salt selected from the group consisting of $LiBF_4$, $LiPF_6$, LiTFSI (lithium bis(trifluoromethanesufonyl)imide), LiFSI (lithium bis(fluorosulfonyl)imide), $LiCF_3SO_3$, $LiClO_4$, $NaBF_4$, $NaPF_6$, NaTFSI, NaFSI, $NaCF_3SO_3$, $NaClO_4$, $Mg(BF_4)_2$, $Mg(PF_6)_2$, $Mg(TFSI)_2$, $Mg(FSI)_2$, $Mg(CF_3SO_3)_2$, $Mg(ClO_4)_2$, $AlCl_3$, $AlBr_3$, and $Al(TFSI)_3$. Due to the electrolyte, the first liquid 12 may have high permittivity, and the potential window of the first liquid 12 may be less than or equal to about 4 V.

The negative electrode 10 has a surface that operates as, for example, a reaction field of the first redox species. The material for forming the negative electrode 10 is stable to, for example, the first liquid 12. The material for forming the negative electrode 10 may be insoluble in the first liquid 12. The material for forming the negative electrode 10 is stable to, for example, an electrochemical reaction which is an electrode reaction. Examples of the material for forming the negative electrode 10 include metals and carbon. Examples of the material used as the material for forming the negative electrode 10 include stainless steel, iron, copper, and nickel.

The negative electrode 10 may have a structure in which the surface area is increased. Examples of the structure in which the surface area is increased include meshes, nonwoven fabrics, surface-roughened plates, and sintered porous bodies. In the case where the negative electrode 10 has any one of these structures, the negative electrode 10 has a large specific surface area. Consequently, an oxidation reaction or a reduction reaction of the first redox species readily advances at the negative electrode 10.

In the flow battery 100, at least part of the negative electrode active material 14 is in contact with the first liquid 12. The negative electrode active material 14 is insoluble in, for example, the first liquid 12. The negative electrode active material 14 can reversibly occlude or release lithium ions. Examples of the material for forming the negative electrode active material 14 include metals, metal oxides, carbon, and silicon. Examples of the metal include lithium, sodium, magnesium, aluminum, and tin. Examples of the metal oxide include titanium oxide. In the case where the first redox species is an aromatic compound and lithium is dissolved in the first liquid 12, the negative electrode active material 14 may contain at least one selected from the group consisting of carbon, silicon, aluminum, and tin.

There is no particular limitation regarding the shape of the negative electrode active material 14. Particles may be adopted, powders may be adopted, or pellets may be adopted. The negative electrode active material 14 may be bound by a binder. Examples of the binder include resins such as polyvinylidene fluorides, polypropylenes, polyethylenes, and polyimides.

In the case where the flow battery 100 includes the negative electrode active material 14, the charge-discharge capacity of the flow battery 100 does not depend on the solubility of the first redox species but depends on the capacity of the negative electrode active material 14. Consequently, the flow battery 100 having a high energy density can be readily realized.

In the flow battery 100, the second liquid 22 functions as an electrolytic solution. A second nonaqueous solvent contains, for example, a compound having at least one selected from the group consisting of a carbonate group and an ether bond. Examples of the compound having at least one selected from the group consisting of a carbonate group and an ether bond include the compounds exemplified with respect to the first nonaqueous solvent. The second nonaqueous solvent may be the same as or different from the first nonaqueous solvent.

The second liquid 22 may further contain a second redox species. At this time, the flow battery 100 may further include a positive electrode active material 24 in contact with the second liquid 22. In the case where the flow battery 100 includes the positive electrode active material 24, the second redox species functions as a positive electrode mediator. The second redox species is dissolved in, for example, the second liquid 22. The second redox species is oxidized or reduced by the positive electrode 20 and oxidized or reduced by the positive electrode active material 24. In the case where the flow battery 100 does not include the positive electrode active material 24, the second redox species functions as an active material that is oxidized or reduced by the positive electrode 20 only.

The second redox species contains, for example, at least one selected from the group consisting of tetrathiafulvalene, benzophenone, and triphenylamine and derivatives thereof. Examples of the triphenylamine derivative include 4,4'-dimethyltriphenylamine and bis(4-formylphenyl)phenylamine. The second redox species may be, for example, a metallocene compound such as ferrocene or titanocene. The second redox species may be a heterocyclic compound, for example, a bipyridyl derivative, a thiophene derivative, a thianthrene derivative, a carbazole derivative, or a phenanthroline derivative. Examples of the phenanthroline derivative include 1,10-phenanthroline. The second redox species may use at least two of these in combination, as the situation demands.

In the lithium-ion-conductive film 30, the average pore diameter of the inorganic member is usually smaller than the molecular size of the second redox species. Therefore, the lithium-ion-conductive film 30 can sufficiently suppress crossover, that is, movement of the second redox species to the first liquid 12. The average pore diameter of the inorganic member is, for example, smaller than the minimum size of the molecular size of the first redox species and the molecular size of the second redox species. In the present specification, the molecular size of the second redox species denotes, for example, the diameter of a minimum size sphere that can circumscribe the second redox species. The molecular size of the second redox species may be calculated by, for example, a first-principles calculation using the density functional method B3LYP/6-31G in the same manner as for the first redox species.

The flow battery 100 according to the present embodiment offers a wide choice of options regarding the first liquid 12, the first redox species, the second liquid 22, and the second redox species. Therefore, the control ranges of the charge potential and the discharge potential of the flow battery 100 are wide, and the charge-discharge capacity of the flow battery 100 can be readily increased. Further, since the first liquid 12 and the second liquid 22 are hardly mixed with each other due to the lithium-ion-conductive film 30, the charge-discharge characteristics of the flow battery 100 can be maintained for a long time.

The positive electrode 20 has a surface that operates as, for example, a reaction field of the second redox species. The material for forming the positive electrode 20 is stable to, for example, the second liquid 22. The material for forming the positive electrode 20 may be insoluble in the second liquid 22. The material for forming the positive electrode 20 is stable to, for example, an electrochemical reaction. Examples of the material for forming the positive electrode 20 include the materials exemplified with respect to the negative electrode 10. The material for forming the positive electrode 20 may be the same or different from the material for forming the negative electrode 10.

The positive electrode 20 may have a structure in which the surface area is increased. Examples of the structure in which the surface area is increased include meshes, nonwoven fabrics, surface-roughened plates, and sintered porous bodies. In the case where the positive electrode 20 has any one of these structures, the positive electrode 20 has a large specific surface area. Consequently, an oxidation reaction or a reduction reaction of the second redox species readily advances at the positive electrode 20.

As described above, in the case where the second liquid 22 contains the second redox species, the flow battery 100 may further include the positive electrode active material 24. At least part of the positive electrode active material 24 is in contact with the second liquid 22. The positive electrode active material 24 is insoluble in, for example, the second liquid 22. The positive electrode active material 24 can reversibly occlude or release lithium ions. Examples of the positive electrode active material 24 include metal oxides such as lithium iron phosphate, LCO ($LiCoO_2$), LMO ($LiMn_2O_4$), and NCA (lithium-nickel-cobalt-aluminum complex oxide).

There is no particular limitation regarding the shape of the positive electrode active material 24. Particles may be adopted, powders may be adopted, or pellets may be adopted. The positive electrode active material 24 may be bound by a binder. Examples of the binder include resins such as polyvinylidene fluorides, polypropylenes, polyethylenes, and polyimides.

In the case where the flow battery 100 includes the negative electrode active material 14 and the positive electrode active material 24, the charge-discharge capacity of the flow battery 100 does not depend on the solubility of neither the first redox species nor the second redox species and depends on the capacities of the negative electrode active material 14 and the positive electrode active material 24. Consequently, the flow battery 100 having a high energy density can be readily realized.

The flow battery 100 may further include an electrochemical reaction portion 60, a negative electrode terminal 16, and a positive electrode terminal 26. The electrochemical reaction portion 60 includes a negative electrode chamber 61 and a positive electrode chamber 62. The lithium-ion-conductive film 30 is disposed inside the electrochemical reaction portion 60. The lithium-ion-conductive film 30 separates the negative electrode chamber 61 and the positive electrode chamber 62 from each other inside the electrochemical reaction portion 60.

The negative electrode chamber 61 stores the negative electrode 10 and the first liquid 12. The negative electrode 10 is in contact with the first liquid 12 inside the negative electrode chamber 61. The positive electrode chamber 62 stores the positive electrode 20 and the second liquid 22. The positive electrode 20 is in contact with the second liquid 22 inside the positive electrode chamber 62.

The negative electrode terminal 16 is electrically connected to the negative electrode 10. The positive electrode terminal 26 is electrically connected to the positive electrode 20. The negative electrode terminal 16 and the positive electrode terminal 26 are electrically connected to, for example, a charge-discharge device. The charge-discharge device can apply a voltage to the flow battery 100 through the negative electrode terminal 16 and the positive electrode terminal 26. The charge-discharge device can also output a power from the flow battery 100 through the negative electrode terminal 16 and the positive electrode terminal 26.

The flow battery 100 may further include a first circulatory mechanism 40 and a second circulatory mechanism 50. The first circulatory mechanism 40 includes a first storage portion 41, a first filter 42, a pipe 43, a pipe 44, and a pump 45. The first storage portion 41 stores the negative electrode active material 14 and the first liquid 12. The negative electrode active material 14 is in contact with the first liquid 12 inside the first storage portion 41. For example, the first liquid 12 is present in gaps of the negative electrode active material 14. The first storage portion 41 is, for example, a tank.

The first filter 42 is disposed at the outlet of the first storage portion 41. The first filter 42 may be disposed at the inlet of the first storage portion 41 or may be disposed at the inlet or the outlet of the negative electrode chamber 61. The first filter 42 may be disposed in the pipe 43 described later. The first filter 42 allows the first liquid 12 to pass through it and suppresses the negative electrode active material 14 passing through it. When the negative electrode active material 14 is in the form of particles, the first filter 42 has, for example, holes smaller than the particle diameter of the negative electrode active material 14. There is no particular limitation regarding the material for forming the first filter 42 provided that the material hardly reacts with the negative electrode active material 14 and the first liquid 12. Examples of the first filter 42 include glass fiber filter paper, polypropylene nonwoven fabrics, polyethylene nonwoven fabrics, polyethylene separators, polypropylene separators, polyimide separators, polyethylene/polypropylene two-layer structure separators, polypropylene/polyethylene/polypropylene three-layer structure separators, and metal meshes that do not react with lithium metal. The first filter 42 can suppress the negative electrode active material 14 flowing out of the first storage portion 41. Consequently, the negative electrode active material 14 remains inside the first storage portion 41. In the flow battery 100, the negative electrode active material 14 itself does not circulate. Therefore, clogging inside the pipe 43 and the like due to the negative electrode active material 14 does not easily occur. The first filter 42 can also suppress occurrence of resistance loss due to the negative electrode active material 14 flowing into the negative electrode chamber 61.

The pipe 43 is connected to, for example, the outlet of the first storage portion 41 with the first filter 42 interposed therebetween. The pipe 43 has one end connected to the outlet of the first storage portion 41 and the other end connected to the inlet of the negative electrode chamber 61. The first liquid 12 is sent from the first storage portion 41 to the negative electrode chamber 61 through the pipe 43.

The pipe 44 has one end connected to the outlet of the negative electrode chamber 61 and the other end connected to the inlet of the first storage portion 41. The first liquid 12 is sent from the negative electrode chamber 61 to the first storage portion 41 through the pipe 44.

The pump 45 is disposed in the midstream of the pipe 44. The pump 45 may be disposed in the midstream of the pipe 43. The pump 45 pressurizes, for example, the first liquid 12. Controlling the pump 45 enables adjusting the flow rate of the first liquid 12. The pump 45 can start circulation of the first liquid 12 or stop circulation of the first liquid 12. However, the flow rate of the first liquid 12 can also be controlled by members other than the pump. Examples of the other member include a valve.

As described above, the first circulatory mechanism 40 can circulate the first liquid 12 between the negative electrode chamber 61 and the first storage portion 41. The first circulatory mechanism 40 can readily increase the amount of the first liquid 12 that comes into contact with the negative electrode active material 14. It can also increase the contact time between the first liquid 12 and the negative electrode active material 14. Consequently, the oxidation reaction and the reduction reaction of the first redox species due to the negative electrode active material 14 can be performed efficiently.

The second circulatory mechanism 50 includes a second storage portion 51, a second filter 52, a pipe 53, a pipe 54, and a pump 55. The second storage portion 51 stores the positive electrode active material 24 and the second liquid 22. The positive electrode active material 24 is in contact with the second liquid 22 inside the second storage portion 51. For example, the second liquid 22 is present in gaps of the positive electrode active material 24. The second storage portion 51 is, for example, a tank.

The second filter 52 is disposed at the outlet of the second storage portion 51. The second filter 52 may be disposed at the inlet of the second storage portion 51 or may be disposed at the inlet or the outlet of the positive electrode chamber 62. The second filter 52 may be disposed in the pipe 53 described later. The second filter 52 allows the second liquid 22 to pass through it and suppresses the positive electrode active material 24 passing through it. When the positive electrode active material 24 is in the form of particles, the second filter 52 has, for example, holes smaller than the particle diameter of the positive electrode active material 24. There is no particular limitation regarding the material for forming the second filter 52 provided that the material hardly reacts with the positive electrode active material 24 and the second liquid 22. Examples of the second filter 52 include glass fiber filter paper, polypropylene nonwoven fabrics, polyethylene nonwoven fabrics, and metal meshes that do not react with lithium metal. The second filter 52 can suppress the positive electrode active material 24 flowing out of the second storage portion 51. Consequently, the positive electrode active material 24 remains inside the second storage portion 51. In the flow battery 100, the positive electrode active material 24 itself does not circulate. Therefore, clogging inside the pipe 53 and the like due to the positive electrode active material 24 does not easily occur. The second filter 52 can also suppress occurrence of resistance loss due to the positive electrode active material 24 flowing into the positive electrode chamber 62.

The pipe 53 is connected to, for example, the outlet of the second storage portion 51 with the second filter 52 interposed therebetween. The pipe 53 has one end connected to the outlet of the second storage portion 51 and the other end connected to the inlet of the positive electrode chamber 62. The second liquid 22 is sent from the second storage portion 51 to the positive electrode chamber 62 through the pipe 53.

The pipe 54 has one end connected to the outlet of the positive electrode chamber 62 and the other end connected to the inlet of the second storage portion 51. The second liquid 22 is sent from the positive electrode chamber 62 to the second storage portion 51 through the pipe 54.

The pump 55 is disposed in the midstream of the pipe 54. The pump 55 may be disposed in the midstream of the pipe 53. The pump 55 pressurizes, for example, the second liquid 22. Controlling the pump 55 enables adjusting the flow rate of the second liquid 22. The pump 55 can start circulation of the second liquid 22 or stop circulation of the second liquid 22. However, the flow rate of the second liquid 22 can also be controlled by members other than the pump. Examples of the other member include a valve.

As described above, the second circulatory mechanism 50 can circulate the second liquid 22 between the positive electrode chamber 62 and the second storage portion 51. The second circulatory mechanism 50 can readily increase the amount of the second liquid 22 that comes into contact with the positive electrode active material 24. It can also increase the contact time between the second liquid 22 and the positive electrode active material 24. Consequently, the oxidation reaction and the reduction reaction of the second redox species due to the positive electrode active material 24 can be performed efficiently.

Figure 3:
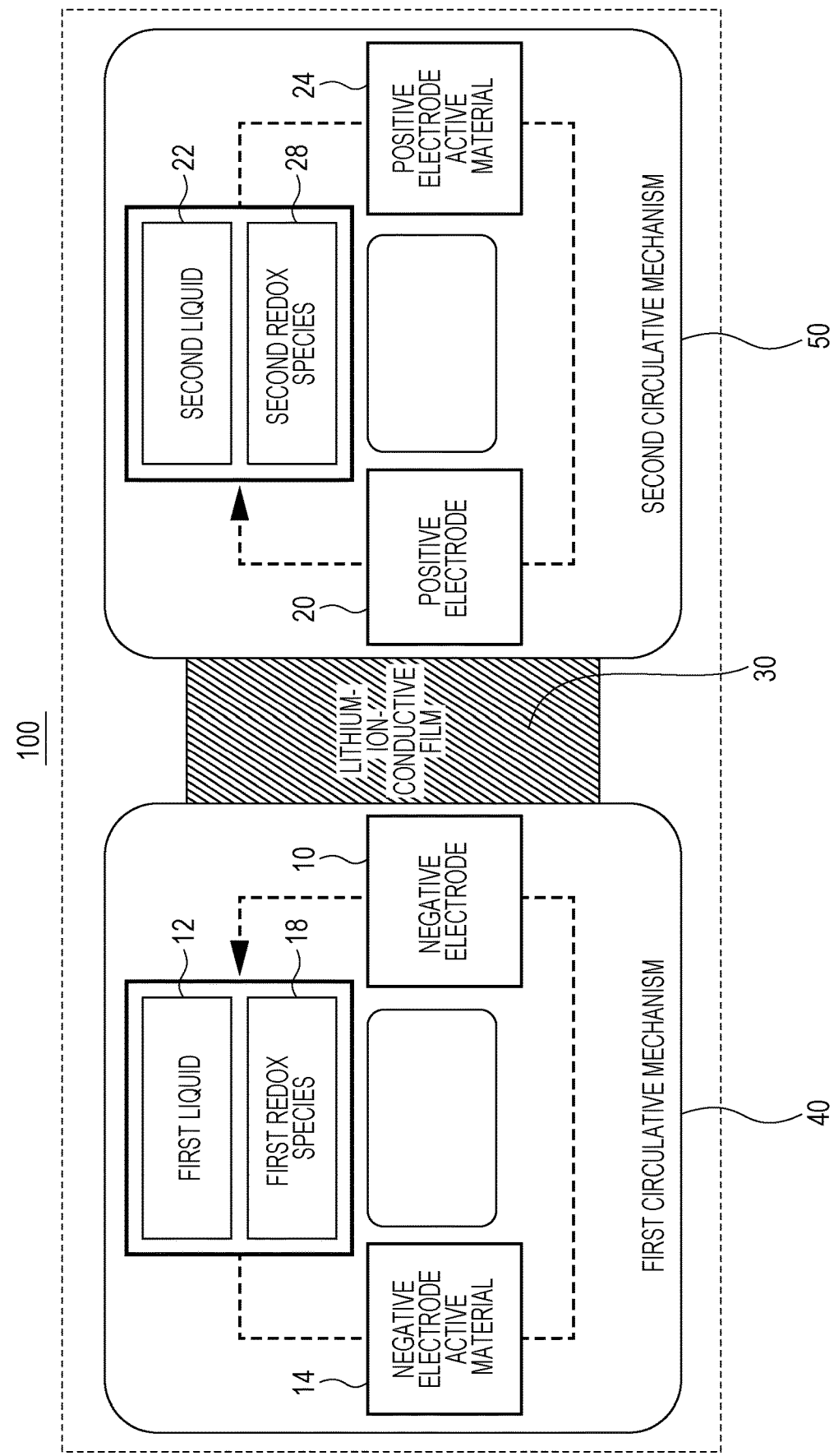
FIG. 3 is a diagram illustrating the operation of the flow battery in FIG. 1.

Next, an example of the operation of the flow battery 100 will be described with reference to FIG. 3. FIG. 3 is a diagram illustrating the operation of the flow battery 100 in FIG. 1. In the following description, the first redox species 18 is also referred to as "Md". The negative electrode active material 14 is also referred to as "NA". In the following description, tetrathiafulvalene (hereafter also referred to as "TTF") is used as the second redox species 28. Lithium iron phosphate (LiFePO$_4$) is used as the positive electrode active material 24.

Charge Process of Flow Battery

The flow battery 100 is charged by applying a voltage to the negative electrode 10 and the positive electrode 20 of the flow battery 100. A negative-electrode-10-side reaction and a positive-electrode-20-side reaction during the charge process will be described below.

Negative-Electrode-Side Reaction

Electrons are supplied from outside of the flow battery 100 to the negative electrode 10 by applying a voltage. Consequently, the first redox species 18 is reduced on the surface of the negative electrode 10. The reduction reaction of the first redox species 18 is represented by, for example, the following reaction formula. In this regard, lithium ions (Li$^+$) are supplied from, for example, the second liquid 22 through the lithium-ion-conductive film 30.

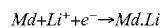

$$Md+Li^{+}+e^{-}\rightarrow Md.Li$$

In the above-described reaction formula, Md.Li is a complex of lithium cations and the reduced first redox species 18. The reduced first redox species 18 has electrons solvated by a solvent of the first liquid 12. The concentration of Md.Li in the first liquid 12 increases as the reduction reaction of the first redox species 18 advances. The potential of the first liquid 12 is reduced with an increase in concentration of Md.Li in the first liquid 12. The potential of the first liquid 12 is reduced to a value lower than the upper limit potential at which the negative electrode active material 14 can occlude lithium ions.

Subsequently, Md.Li is sent to the negative electrode active material 14 by the first circulatory mechanism 40. The potential of the first liquid 12 is lower than the upper limit potential at which the negative electrode active material 14 can occlude lithium ions. As a result, the negative electrode active material 14 receives lithium ions and electrons from Md.Li. Consequently, the first redox species 18 is oxidized, and the negative electrode active material 14 is reduced. This reaction is represented by, for example, the following reaction formula. In this regard, in the reaction formula given below, each of s and t is an integer of 1 or more.

$$sNA + tMd.Li \rightarrow NA_sLi_t + tMd$$

In the above-described reaction formula, $NA_sLi_t$ is a lithium compound formed by the negative electrode active material 14 occluding lithium ions. When the negative electrode active material 14 contains graphite, in the above-described reaction formula, for example, s is 6 and t is 1. At this time, $NA_sLi_t$ is $C_6Li$. When the negative electrode active material 14 contains aluminum, tin, or silicon, in the above-described reaction formula, for example, s is 1 and t is 1. At this time, $NA_sLi_t$ is LiAl, LiSn, or LiSi.

The first redox species 18 oxidized by the negative electrode active material 14 is sent to the negative electrode 10 by the first circulatory mechanism 40. The first redox species 18 sent to the negative electrode 10 is reduced again on the surface of the negative electrode 10. As a result, Md.Li is formed. In this manner, the negative electrode active material 14 is charged by the circulation of the first redox species 18. That is, the first redox species 18 functions as a charge mediator.

Positive-Electrode-Side Reaction

The second redox species 28 is oxidized on the surface of the positive electrode 20 by applying a voltage. As a result, electrons are output outside the flow battery 100 from the positive electrode 20. The oxidation reaction of the second redox species 28 is represented by, for example, the following reaction formula.

$$TTF \rightarrow TTF^+ + e^-$$

$$TTF^+ \rightarrow TTF^{2+} + e^-$$

The second redox species 28 oxidized at the positive electrode 20 is sent to the positive electrode active material 24 by the second circulatory mechanism 50. The second redox species 28 sent to the positive electrode active material 24 is reduced by the positive electrode active material 24. On the other hand, the positive electrode active material 24 is oxidized by the second redox species 28. The positive electrode active material 24 oxidized by the second redox species 28 releases lithium. This reaction is represented by, for example, the following reaction formula.

$$LiFePO_4 + TTF^{2+} \rightarrow FePO_4 + Li^+ + TTF^+$$

The second redox species 28 reduced by the positive electrode active material 24 is sent to the positive electrode 20 by the second circulatory mechanism 50. The second redox species 28 sent to the positive electrode 20 is oxidized again on the surface of the positive electrode 20. This reaction is represented by, for example, the following reaction formula.

$$TTF^+ \rightarrow TTF^{2+} + e^-$$

In this manner, the positive electrode active material 24 is charged by the circulation of the second redox species 28.

That is, the second redox species 28 functions as a charge mediator. Li ions (Li$^+$) generated by charging the flow battery 100 move to the first liquid 12 through, for example, the lithium-ion-conductive film 30.

Discharge Process of Flow Battery

Regarding the charged flow battery 100, a power can be output from the negative electrode 10 and the positive electrode 20. A negative-electrode-10-side reaction and a positive-electrode-20-side reaction during the discharge process will be described below.

Negative-Electrode-Side Reaction

The first redox species 18 is oxidized on the surface of the negative electrode 10 by discharge of the flow battery 100. As a result, electrons are output outside the flow battery 100 from the negative electrode 10. The oxidation reaction of the first redox species 18 is represented by, for example, the following reaction formula.

$$Md.Li \rightarrow Md + Li^+ + e^-$$

The concentration of Md.Li in the first liquid 12 decreases as the oxidation reaction of the first redox species 18 advances. The potential of the first liquid 12 increases with a decrease in concentration of Md.Li in the first liquid 12. Consequently, the potential of the first liquid 12 is higher than the equilibrium potential of $NA_sLi_t$.

Thereafter, the first redox species 18 oxidized at the negative electrode 10 is sent to the negative electrode active material 14 by the first circulatory mechanism 40. In the case where the potential of the first liquid 12 is higher than the equilibrium potential of $NA_sLi_t$, the first redox species 18 receives lithium ions and electrons from $NA_sLi_t$. Consequently, the first redox species 18 is reduced and the negative electrode active material 14 is oxidized. This reaction is represented by, for example, the following reaction formula. In this regard, in the reaction formula given below, each of s and t is an integer of 1 or more.

$$NA_sLi_t + tMd \rightarrow sNA + tMd.Li$$

Subsequently, Md.Li is sent to the negative electrode 10 by the first circulatory mechanism 40. Md.Li sent to the negative electrode 10 is oxidized again on the surface of the negative electrode 10. In this manner, the negative electrode active material 14 discharges by the circulation of the first redox species 18. That is, the first redox species 18 functions as a discharge mediator. Lithium ions (Li$^+$) generated by discharge of the flow battery 100 move to, for example, the second liquid 22 through the lithium-ion-conductive film 30.

Positive-Electrode-Side Reaction

Electrons are supplied from outside of the flow battery 100 to the positive electrode 20 by discharge of the flow battery 100. Consequently, the second redox species 28 is reduced on the surface of the positive electrode 20. The reduction reaction of the second redox species 28 is represented by, for example, the following reaction formula.

$$TTF^{2+} + e^- \rightarrow TTF^+$$

$$TTF^+ + e^- \rightarrow TTF$$

The second redox species 28 reduced at the positive electrode 20 is sent to the positive electrode active material 24 by the second circulatory mechanism 50. The second redox species 28 sent to the positive electrode active material 24 is oxidized by the positive electrode active material 24. On the other hand, the positive electrode active material 24 is reduced by the second redox species 28. The positive electrode active material 24 reduced by the second redox species 28 occludes lithium. This reaction is represented by, for example, the following reaction formula. In this regard, lithium ions (Li$^+$) are supplied from, for example, the first liquid 12 through the lithium-ion-conductive film 30.

$$FePO_4 + Li^+ + TTF \rightarrow LiFePO_4 + TTF^+$$

Thereafter, the second redox species 28 oxidized by the positive electrode active material 24 is sent to the positive electrode 20 by the second circulatory mechanism 50. The second redox species 28 sent to the positive electrode 20 is reduced again on the surface of the positive electrode 20. This reaction is represented by, for example, the following reaction formula.

$$TTF^+ + e^- \rightarrow TTF$$

In this manner, the positive electrode active material 24 discharges by the circulation of the second redox species 28. That is, the second redox species 28 functions as a discharge mediator.

In the flow battery 100 according to the present embodiment, the inorganic member of the lithium-ion-conductive film 30 has pores derived from zeolite. In general, the pores have an average diameter larger than the lithium ion size and smaller than the molecular size of the first redox species 18 and the molecular size of the second redox species 28. Consequently, the inorganic member allows lithium ions to pass through it but hardly allow the first redox species 18 and the second redox species 28 to pass through it. The inorganic member can suppress movement of chemical species other than lithium ions between the first liquid 12 and the second liquid 22. In other words, zeolite contained in the inorganic member functions as a molecular sieve. The lithium-ion-conductive film 30 containing the inorganic member enables suppressing crossover, that is, suppressing movement of the first redox species 18 from the first liquid 12 to the second liquid 22 or movement of the second redox species 28 from the second liquid 22 to the first liquid 12. Further, when the inorganic member is the inorganic layer 35, crossover of the first redox species 18 and the second redox species 28 can be further reliably suppressed. Suppressing crossover of the first redox species 18 and the second redox species 28 enables realizing the flow battery 100 that can maintain a high capacity for a long time.

To increase the output of the flow battery 100, the surface area of the principal surface of the lithium-ion-conductive film 30 may be increased. In the flow battery 100 according to the present embodiment, the surface area of the principal surface of the lithium-ion-conductive film 30 can be readily increased compared with the lithium-ion-conductive film in the related art. For example, Japanese Unexamined Patent Application Publication No. 2018-18816 discloses Li$_7$La$_3$Zr$_2$O (abbreviated as LLZ) which is a solid electrolyte as the material for forming the separating portion having lithium-ion conductivity. The solid electrolyte is hard and having low toughness. Consequently the larger the surface area of the principal surface of the separating portion composed of the solid electrolyte is, the higher the possibility of occurrence of cracking in the separating portion may be. An increase in the thickness of the separating portion may be a measure to suppress occurrence of cracking in the separating portion composed of a solid electrolyte. However, if the thickness of the separating portion increases, the lithium-ion conductivity of the separating portion is reduced and the output of the flow battery is reduced. Therefore, in the case where the surface area of the principal surface of the separating portion composed of the solid electrolyte is increased, it is difficult to ensure compatibility between the durability and the lithium-ion conductivity of the separating portion. Meanwhile, regarding the flow battery 100 according to the present embodiment, in the lithium-ion-conductive film 30, the inorganic member is supported by the porous supporter. Even in the case where the surface area of the principal surface of the lithium-ion-conductive film 30 is increased, since the mechanical strength of the inorganic member is maintained by the porous supporter, there is almost no need to increase the thickness of the inorganic member. That is, regarding the lithium-ion-conductive film 30, the surface area of the principal surface can be readily increased while ensuring compatibility between the durability and the lithium-ion conductivity.

As described above, the zeolite in the inorganic member of the lithium-ion-conductive film 30 may contain lithium ions. With this, lithium ions that exist in the first liquid 12 can readily move to the second liquid 22 through the lithium-ion-conductive film 30. Likewise, lithium ions that exist in the second liquid 22 can readily move to the first liquid 12. In particular, in the case where lithium ions are located in the vicinity of aluminum atoms constituting the inner walls of the pores of the zeolite, lithium ions can further readily move inside the pores of the zeolite. In this manner, the zeolite containing lithium ions improves the lithium-ion conductivity of the lithium-ion-conductive film 30. The zeolite containing lithium ions also increases the output of the flow battery 100.

EXAMPLES

The present disclosure will be specifically described with reference to the examples. However, the present disclosure is not limited to the following examples.

Example 1

A container in which the inside is partitioned by the lithium-ion-conductive film was prepared. As the lithium-ion-conductive film, HZM-1 produced by Hitachi Zosen Corporation was used. The lithium-ion-conductive film was a multilayer body of an inorganic layer formed of LTA-type zeolite and a porous supporter formed of alumina. The inorganic layer included pores that were derived from the LTA-type zeolite and that had an average diameter of about 0.4 nm. The molar ratio Si/Al in the LTA-type zeolite was 1. The LTA-type zeolite contained sodium in addition to aluminum and silicon and contained no lithium. The average thickness of the inorganic layer was about 5 µm. The average hole diameter of the porous supporter was about 2 µm. The thickness of the porous supporter was about 2 mm.

In the container, lithium foil serving as a negative electrode was arranged in one space partitioned by the lithium-ion-conductive film. Further, stainless steel serving as a positive electrode was arranged in the other space partitioned by the lithium-ion-conductive film.

A first liquid was prepared by dissolving biphenyl serving as the first redox species, a lithium metal, and LiPF$_6$ serving as an electrolyte salt into triglyme (triethylene glycol dimethyl ether) serving as a first nonaqueous solvent. The concentration of biphenyl in the first liquid was 0.1 mol/L. The concentration of lithium ions derived from the lithium metal in the first liquid was 0.2 mol/L. The concentration of LiPF$_6$ in the first liquid was 1 mol/L. The first liquid was injected into the space, in the container, in which the negative electrode was arranged.

A second liquid was prepared by dissolving tetrathiafulvalene serving as the second redox species and LiPF$_6$ serving as an electrolyte salt into triglyme serving as a second nonaqueous solvent. The concentration of tetrathiafulvalene in the second liquid was 5 mmol/L. The concentration of $LiPF_6$ in the second liquid was 1 mol/L. The second liquid was injected, in the container, into the space in which the positive electrode was arranged. In this manner, an evaluation cell in example 1 was obtained.

Figure 4:
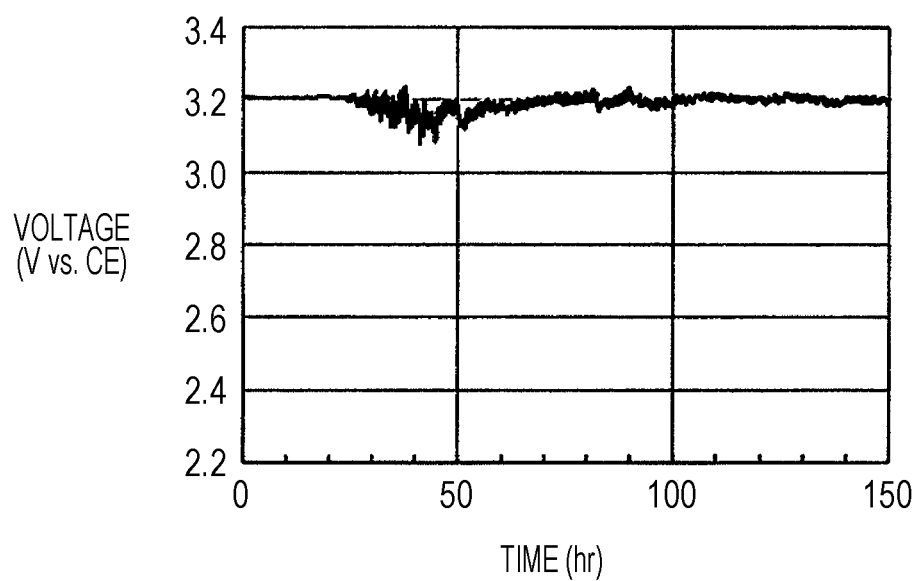
FIG. 4 is a graph illustrating the measurement result of the open circuit voltage of an evaluation cell in example 1.

The open circuit voltage of the evaluation cell in example 1 was measured. FIG. 4 is a graph illustrating the measurement result of the open circuit voltage of the evaluation cell in example 1. As illustrated clearly in FIG. 4, the open circuit voltage of the evaluation cell in example 1 was maintained at about 3.2 V even after 150 hours were elapsed from the start of the measurement. As is shown clearly by the result, in the evaluation cell in example 1, crossover, that is, movement of the first redox species from the first liquid to the second liquid or movement of the second redox species from the second liquid to the first liquid, was suppressed. That is, the multilayer body of the inorganic layer formed of LTA-type zeolite and the porous supporter formed of alumina functioned effectively as a lithium-ion-conductive film. Meanwhile, it was ascertained from the graph in FIG. 4 that the open circuit voltage was reduced at the initial stage of the measurement. It is probable that the reduction in the open circuit voltage was caused by a very small amount of water present in the inorganic layer.

Figure 5:
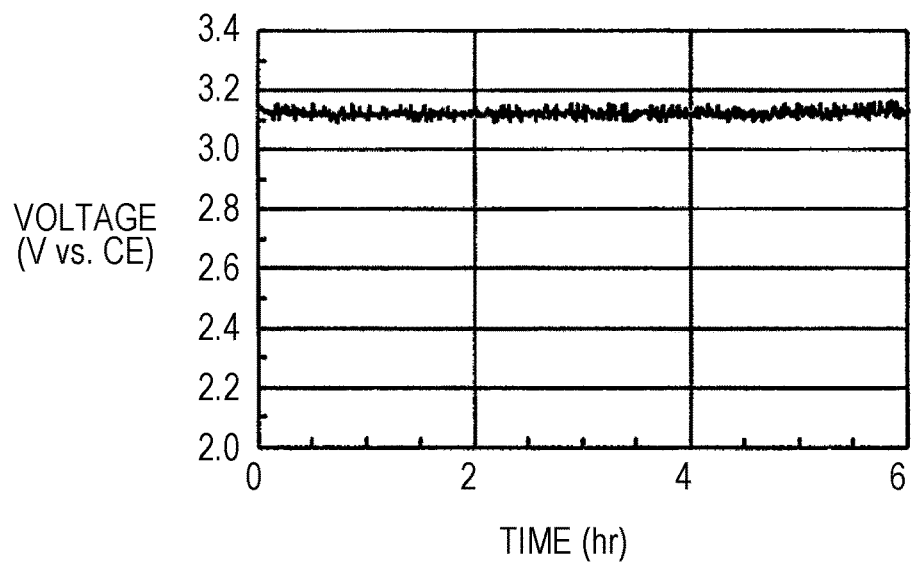
FIG. 5 is a graph illustrating the result of a discharge test of the evaluation cell in example 1.

A discharge test of the evaluation cell in example 1 was performed. FIG. 5 is a graph illustrating the result of the discharge test of the evaluation cell in example 1. In the discharge test, a discharge current of 0.1 μA was observed. The discharge voltage at this time was about 3.1 V. As is shown clearly by the result, the multilayer body of the inorganic layer formed of LTA-type zeolite and the porous supporter formed of alumina has sufficient lithium-ion conductivity.

Alternating current impedance of the evaluation cell in example 1 was measured. As is clear from this measurement, regarding the evaluation cell in example 1, the resistance of the lithium-ion-conductive film was about 50 kΩ.

Example 2

An evaluation cell in example 2 was obtained by using the same method as in example 1 except that HZM-3 produced by Hitachi Zosen Corporation was used as the lithium-ion-conductive film. The lithium-ion-conductive film was a multilayer body of an inorganic layer formed of MOR-type zeolite and a porous supporter formed of alumina. The inorganic layer included pores that were derived from the MOR-type zeolite and that had an average diameter of about 0.7 nm. The molar ratio Si/Al in the MOR-type zeolite was greater than or equal to 5 and less than or equal to 10. The MOR-type zeolite contained no lithium. The average thickness of the inorganic layer was about 5 μm. The average hole diameter of the porous supporter was about 2 μm. The thickness of the porous supporter was about 2 mm.

Figure 6:
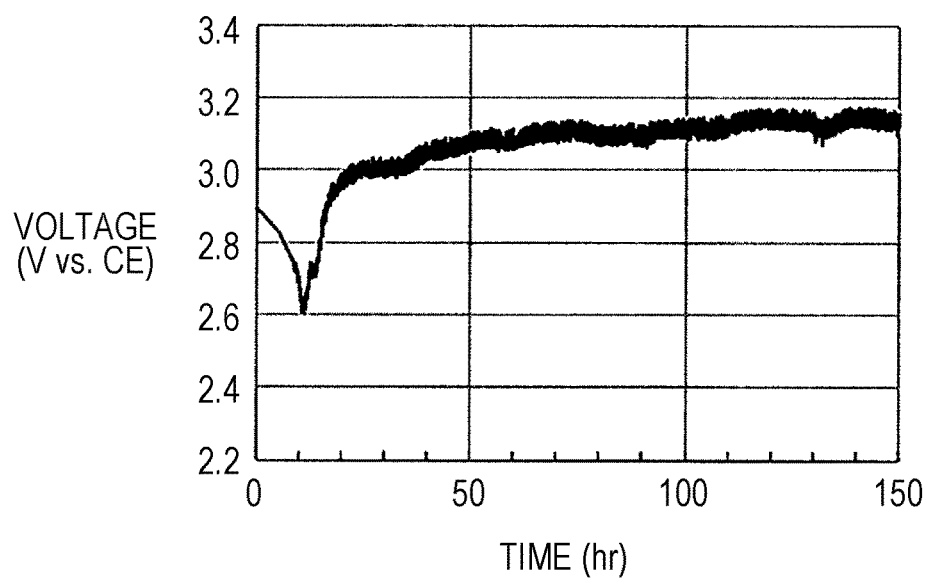
FIG. 6 is a graph illustrating the measurement result of the open circuit voltage of an evaluation cell in example 2.

The open circuit voltage of the evaluation cell in example 2 was measured. FIG. 6 is a graph illustrating the measurement result of the open circuit voltage of the evaluation cell in example 2. As illustrated clearly in FIG. 6, the open circuit voltage of the evaluation cell in example 2 was maintained at about 3.1 V even after 150 hours were elapsed from the start of the measurement. As is shown clearly by the result, in the evaluation cell in example 2, crossover, that is, movement of the first redox species from the first liquid to the second liquid or movement of the second redox species from the second liquid to the first liquid, was suppressed. That is, the multilayer body of the inorganic layer formed of MOR-type zeolite and the porous supporter formed of alumina functioned effectively as a lithium-ion-conductive film. Meanwhile, it was ascertained from the graph in FIG. 6 that the open circuit voltage was reduced at the initial stage of the measurement. It is probable that the reduction in the open circuit voltage was caused by a very small amount of water present in the inorganic layer, in the same manner as in example 1.

Figure 7:
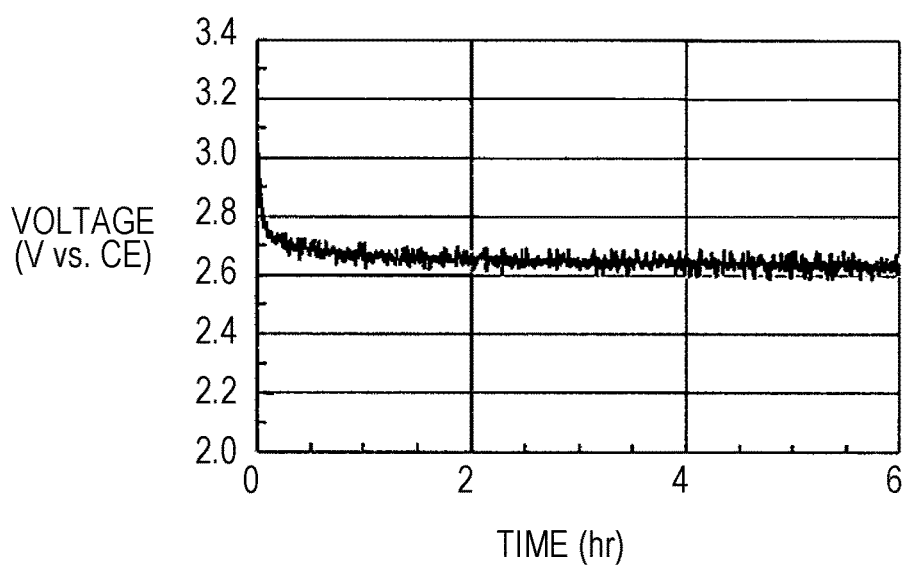
FIG. 7 is a graph illustrating the result of a discharge test of the evaluation cell in example 2.

A discharge test of the evaluation cell in example 2 was performed. FIG. 7 is a graph illustrating the result of the discharge test of the evaluation cell in example 2. In the discharge test, a discharge current of 0.1 μA was observed. The discharge voltage at this time was about 2.6 V. As is shown clearly by the result, the multilayer body of the inorganic layer formed of MOR-type zeolite and the porous supporter formed of alumina has sufficient lithium-ion conductivity.

Example 3

An evaluation cell in example 3 was obtained by using the same method as in example 1 except that HZM-4 produced by Hitachi Zosen Corporation was used as the lithium-ion-conductive film. The lithium-ion-conductive film was a multilayer body of an inorganic layer formed of CHA-type zeolite and a porous supporter formed of alumina. The inorganic layer included pores that were derived from the CHA-type zeolite and that had an average diameter of about 0.4 nm. The molar ratio Si/Al in the CHA-type zeolite was greater than or equal to 10 and less than or equal to 25. The CHA-type zeolite contained no lithium. The average thickness of the inorganic layer was about 5 μm. The average hole diameter of the porous supporter was about 2 μm. The thickness of the porous supporter was about 2 mm.

Figure 8:
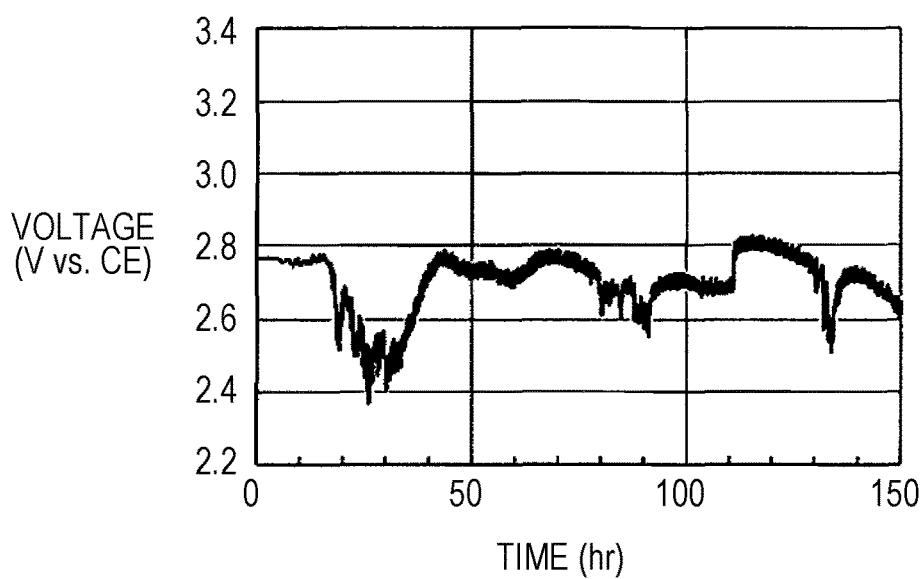
FIG. 8 is a graph illustrating the measurement result of the open circuit voltage of an evaluation cell in example 3.

The open circuit voltage of the evaluation cell in example 3 was measured. FIG. 8 is a graph illustrating the measurement result of the open circuit voltage of the evaluation cell in example 3. As illustrated clearly in FIG. 8, the open circuit voltage of the evaluation cell in example 3 was maintained at about 2.7 V even after 150 hours were elapsed from the start of the measurement. As is shown clearly by the result, in the evaluation cell in example 3, crossover, that is, movement of the first redox species from the first liquid to the second liquid or movement of the second redox species from the second liquid to the first liquid, was suppressed. That is, the multilayer body of the inorganic layer formed of CHA-type zeolite and the porous supporter formed of alumina functioned effectively as a lithium-ion-conductive film. Meanwhile, it was ascertained from the graph in FIG. 8 that the open circuit voltage was reduced at the initial stage of the measurement. Further, variations in the open circuit voltage after the initial stage of the measurement were ascertained from the graph in FIG. 8. It is probable that the reduction in the open circuit voltage was caused by a very small amount of water present in the inorganic layer. It is probable that variations in the open circuit voltage after the initial stage are caused by the multilayer body of the inorganic layer formed of CHA-type zeolite and the porous supporter formed of alumina having poor lithium-ion conductivity, as described later.

A discharge test of the evaluation cell in example 3 was performed. In the discharge test, a discharge current greater than or equal to 0.1 μA was not observed. As is shown clearly by the result, the multilayer body of the inorganic layer formed of CHA-type zeolite and the porous supporter formed of alumina had poor lithium-ion conductivity compared with the multilayer bodies in examples 1 and 2. The molar ratio Si/Al in the CHA-type zeolite was higher than the zeolite in examples 1 and 2. That is, the aluminum atom content in the CHA-type zeolite was relatively low. It is probable that, in the CHA-type zeolite, since the sites capable of stabilizing alkali metal ions were small in number, movement of lithium ions was suppressed.

Example 4

An evaluation cell in example 4 was obtained by using the same method as in example 1 except that HZM-1 produced by Hitachi Zosen Corporation and subjected to ion exchange treatment was used as the lithium-ion-conductive film. Ion exchange treatment was performed by using the following method. Initially, a LiCl aqueous solution was prepared as an aqueous solution containing lithium ions. The LiCl concentration in the aqueous solution was 2 mol/L. Thereafter, the LiCl aqueous solution was heated to 90° C. The above-described HZM-1 was immersed in the LiCl aqueous solution for 2 hours. Subsequently, HZM-1 was taken out of the LiCl aqueous solution, and HZM-1 was washed with water. Regarding HZM-1, operations of immersing in the LiCl aqueous solution and washing with water were repeated 3 times. Thereafter, HZM-1 was subjected to drying treatment in the air at 70° C. for 24 hours. Further, HZM-1 was subjected to drying treatment in a vacuum at 180° C. for 60 hours. In this manner, sodium ions in the LTA-type zeolite contained in HZM-1 were exchanged for lithium ions. The zeolite containing lithium ions was obtained by the above-described operations.

Exchanging sodium ions for lithium ions in the LTA-type zeolite was examined by element analysis. In particular, the zeolite was subjected to energy dispersive X-ray analysis (EDX) and laser-induced breakdown spectroscopic analysis (LIBS) before and after the ion exchange treatment. It was ascertained from the results of EDX and LIBS that sodium disappeared from the zeolite due to the ion exchange treatment. It was ascertained from the result of LIBS that the zeolite newly contained lithium due to the ion exchange treatment.

Figure 9A:
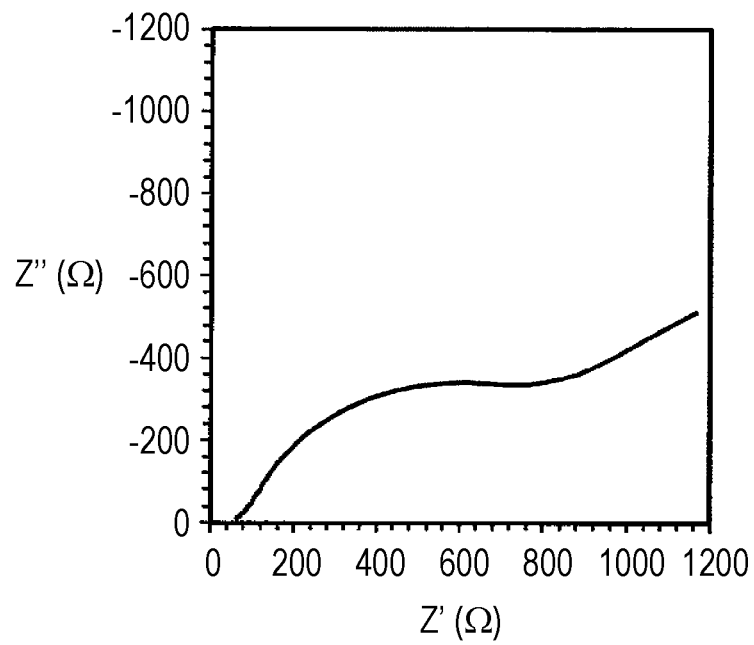
FIG. 9A is a graph illustrating the result of an alternating current impedance measurement of an evaluation cell in example 4.
Figure 9B:
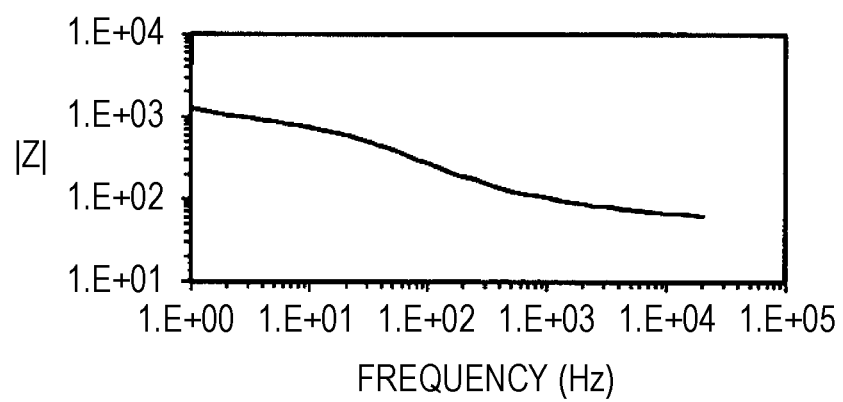
FIG. 9B is a graph illustrating the result of the alternating current impedance measurement of the evaluation cell in example 4.
Figure 9C:
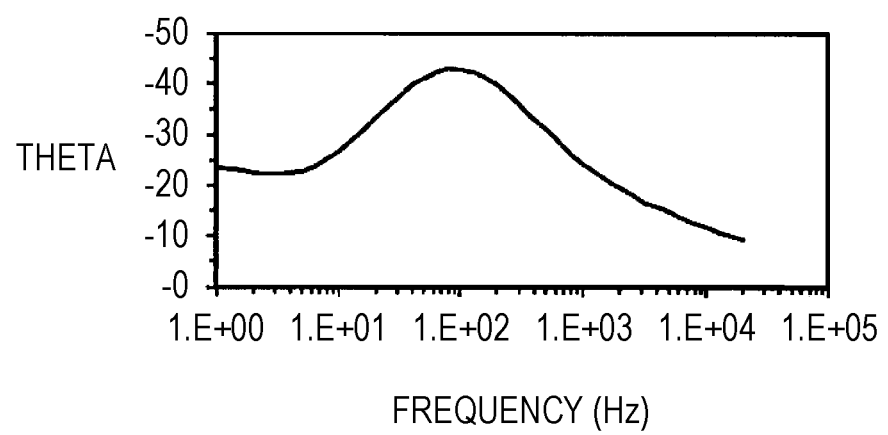
FIG. 9C is a graph illustrating the result of the alternating current impedance measurement of the evaluation cell in example 4.

Next, alternating current impedance of the evaluation cell in example 4 was measured. FIG. 9A to FIG. 9C are graphs illustrating the results of the alternating current impedance measurement of the evaluation cell in example 4. As clearly illustrated in FIG. 9A to FIG. 9C, regarding the evaluation cell in example 4, the solution resistance was about 0.1 k. Further, the resistance of the lithium-ion-conductive film was about 1 k. As is clear from comparison with example 1, regarding the evaluation cell in example 4, since the zeolite in the lithium-ion-conductive film contains lithium ions, the resistance of the lithium-ion-conductive film was reduced to a great extent. That is, the conduction of lithium ions through pores of the zeolite was smoothened.

Figure 10:
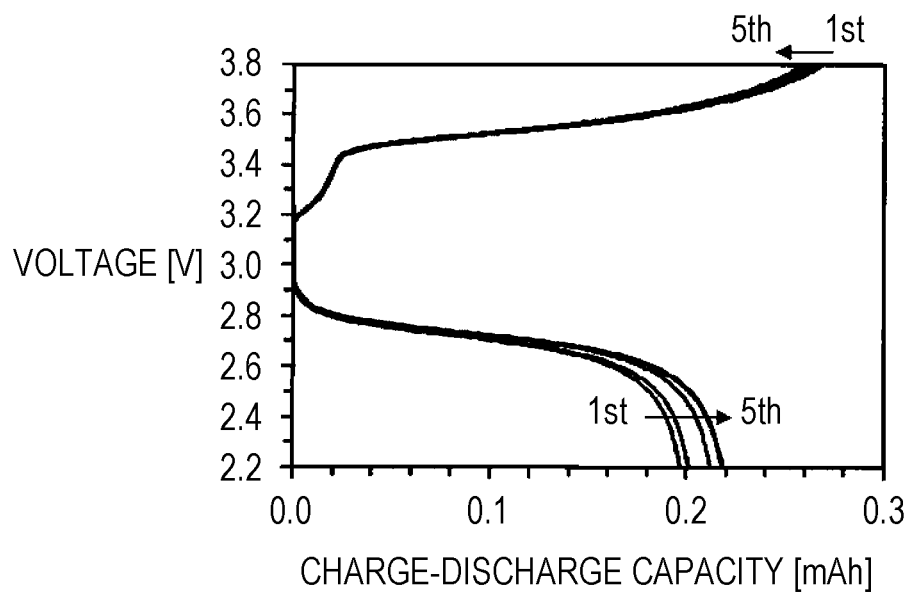
FIG. 10 is a graph illustrating the result of a charge-discharge test of the evaluation cell in example 4.

A charge-discharge test of the evaluation cell in example 4 was performed. FIG. 10 is a graph illustrating the result of the charge-discharge test of the evaluation cell in example 4. In the charge test, a charge current of 200 µA was observed. In the discharge test, a discharge current of 200 µA was observed. The charge-discharge was repeated 5 cycles. As is shown clearly by the result, the multilayer body of the inorganic layer formed of LTA-type zeolite subjected to the lithium-ion exchange treatment and the porous supporter formed of alumina has sufficient lithium-ion conductivity.

Figure 11:
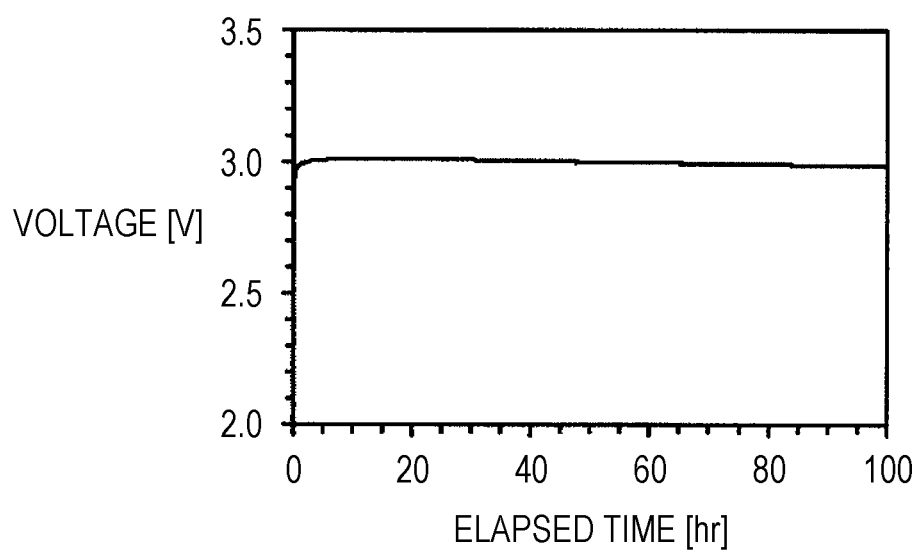
FIG. 11 is a graph illustrating the measurement result of the open circuit voltage of the evaluation cell in example 4.

The open circuit voltage of the evaluation cell in example 4 was measured after the above-described charge-discharge test. FIG. 11 is a graph illustrating the measurement result of the open circuit voltage of the evaluation cell in example 4. As illustrated clearly in FIG. 11, the open circuit voltage of the evaluation cell in example 4 was maintained at about 3.0 V even after 100 hours were elapsed from the start of the measurement. As is shown clearly by the result, in the evaluation cell in example 4, crossover, that is, movement of the first redox species from the first liquid to the second liquid or movement of the second redox species from the second liquid to the first liquid, was suppressed. That is, the multilayer body of the inorganic layer formed of LTA-type zeolite containing lithium ions and the porous supporter formed of alumina functioned effectively as a lithium-ion-conductive film.

Comparative Example 1

An evaluation cell in comparative example 1 was obtained by using the same method as in example 1 except that a polyolefin three-layer separator for a lithium ion battery was used as the lithium-ion-conductive film. The average hole diameter of the three-layer separator was 150 nm. The thickness of the three-layer separator was 20 µm.

Figure 12:
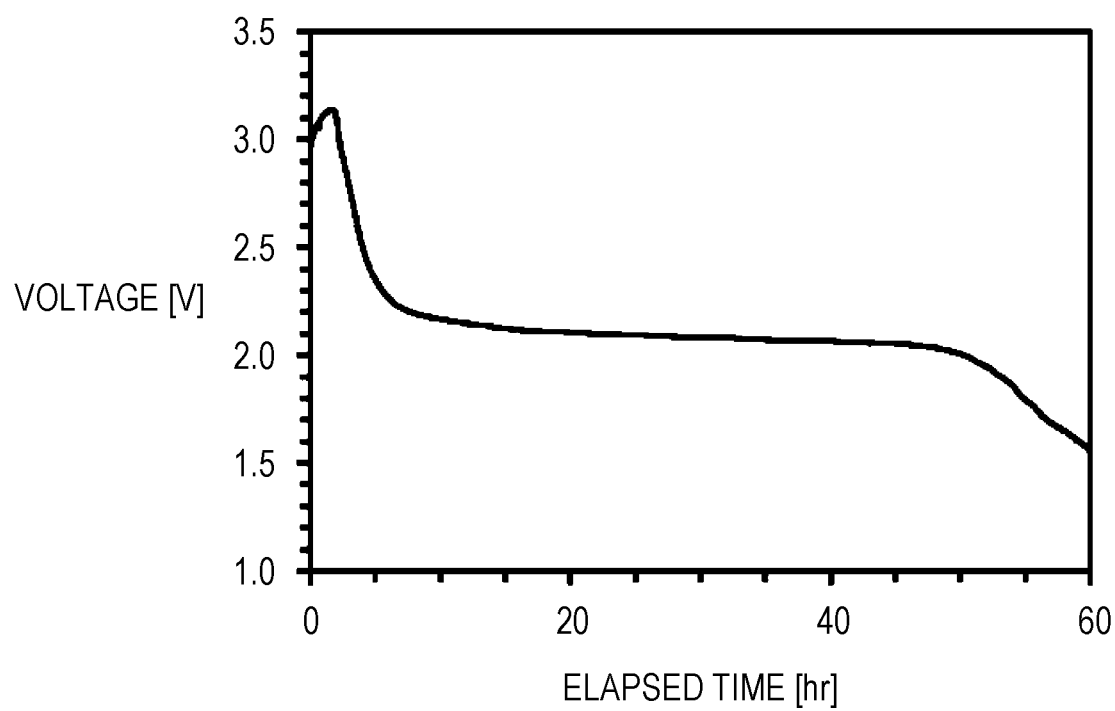
FIG. 12 is a graph illustrating the measurement result of the open circuit voltage of an evaluation cell in comparative example 1.

The open circuit voltage of the evaluation cell in comparative example 1 was measured. FIG. 12 is a graph illustrating the measurement result of the open circuit voltage of the evaluation cell in comparative example 1. As illustrated clearly in FIG. 12, the open circuit voltage of the evaluation cell in comparative example 1 was reduced considerably from the start of the measurement and reduced to about 1.6 V after 60 hours were elapsed. As is shown clearly by the result, crossover, that is, movement of the first redox species from the first liquid to the second liquid or movement of the second redox species from the second liquid to the first liquid, occurred.

Comparative Example 2

An evaluation cell in comparative example 2 was obtained by using the same method as in example 1 except that an alumina porous body was used as the lithium-ion-conductive film. The average hole diameter of the porous body was about 2 µm. The thickness of the porous body was about 2 mm.

The open circuit voltage of the evaluation cell in comparative example 2 was measured. In the evaluation cell in comparative example 2, the open circuit voltage was reduced rapidly from the start of the measurement. As is shown clearly by the result, crossover, that is, movement of the first redox species from the first liquid to the second liquid or movement of the second redox species from the second liquid to the first liquid, occurred. That is, the alumina porous body did not function as a lithium-ion-conductive film.

As described above, in the examples, evaluations to predict the performance of the flow battery according to the present embodiment were performed. The present inventors ascertained that the findings obtained on the basis of the examples can be applied to the flow battery.

The flow battery according to the present disclosure can be used as, for example, a storage battery device or a storage battery system.

What is claimed is:
1. A flow battery comprising:
a negative electrode;
a positive electrode;
a first liquid in contact with the negative electrode;
a second liquid in contact with the positive electrode; and a lithium-ion-conductive film disposed between the first liquid and the second liquid, wherein at least one of the first liquid or the second liquid contains a redox species and lithium ions, and the lithium-ion-conductive film includes one of (i) an inorganic layer member containing zeolite disposed between two porous supporters, or (ii) a porous supporter disposed between two inorganic layers containing zeolite.

2. The flow battery according to claim 1, wherein the inorganic layer member or each of the two inorganic layers has a thickness which is greater than or equal to 0.1 μm and is less than or equal to 100 μm.

3. The flow battery according to claim 1, wherein the porous supporter or each of the two porous supporters contains an inorganic material.

4. The flow battery according to claim 1, wherein the porous supporter or each of the two porous supporters contains at least one selected from the group consisting of alumina, silica, zirconia, and glass.

5. The flow battery according to claim 1, wherein the porous supporter or each of the two porous supporters has an average hole diameter which is greater than or equal to 10 nm and is less than or equal to 100 μm.

6. The flow battery according to claim 1, wherein a ratio of an amount of substance of silicon atoms to an amount of substance of aluminum atoms in the zeolite is greater than or equal to 1 and is less than or equal to 25.

7. The flow battery according to claim 6, wherein the ratio is greater than or equal to 1 and is less than or equal to 10.

8. The flow battery according to claim 1, wherein the zeolite contains lithium ions.

9. The flow battery according to claim 1 further comprising:

a negative electrode active material in contact with the first liquid, wherein the redox species is a first redox species contained in the first liquid, and the first redox species is oxidized or reduced by the negative electrode and is oxidized or reduced by the negative electrode active material.

10. The flow battery according to claim 9 further comprising:

a first circulatory mechanism configured to circulate the first liquid between the negative electrode and the negative electrode active material.

11. The flow battery according to claim 1 further comprising:

a positive electrode active material in contact with the second liquid, wherein the redox species is a second redox species contained in the second liquid, and the second redox species is oxidized or reduced by the positive electrode and is oxidized or reduced by the positive electrode active material.

12. The flow battery according to claim 11 further comprising:

a second circulatory mechanism configured to circulate the second liquid between the positive electrode and the positive electrode active material.

* * * * *